United States Patent
Guinart et al.

(10) Patent No.: US 11,865,874 B2
(45) Date of Patent: Jan. 9, 2024

(54) METHOD FOR DETECTING A CHANGE IN LOCATION OF AT LEAST ONE WHEEL OF A MOTOR VEHICLE

(71) Applicant: Continental Automotive Technologies GmbH, Hannover (DE)

(72) Inventors: Nicolas Guinart, Toulouse (FR); Jean-Phillippe Boisset, Toulouse (FR); Sylvain Godet, Toulouse (FR)

(73) Assignee: Continental Automotive Technologies GmbH

( * ) Notice: Subject to any disclaimer, the term of this patent is extended or adjusted under 35 U.S.C. 154(b) by 0 days.

(21) Appl. No.: 18/024,551

(22) PCT Filed: Aug. 25, 2021

(86) PCT No.: PCT/EP2021/073505
§ 371 (c)(1),
(2) Date: Mar. 3, 2023

(87) PCT Pub. No.: WO2022/048968
PCT Pub. Date: Mar. 10, 2022

(65) Prior Publication Data
US 2023/0286336 A1 Sep. 14, 2023

(30) Foreign Application Priority Data
Sep. 4, 2020 (FR) ........................... 2008995

(51) Int. Cl.
*B60C 23/04* (2006.01)
(52) U.S. Cl.
CPC ........ *B60C 23/0416* (2013.01); *B60C 23/045* (2013.01); *B60C 23/0437* (2013.01); *B60C 23/0438* (2013.01)

(58) Field of Classification Search
None
See application file for complete search history.

(56) References Cited

U.S. PATENT DOCUMENTS 6,469,621 B1 * 10/2002 Vredevoogd ....... B60C 23/0408
340/447
6,489,888 B1 * 12/2002 Honeck ............... B60C 23/0416
340/447

(Continued)

FOREIGN PATENT DOCUMENTS

DE 102011004561 A1 8/2012
DE 102015115731 A1 3/2017

(Continued)

OTHER PUBLICATIONS

English Translation of the Written Opinion for International Application No. PCT/EP2021/073463, dated Oct. 19, 2021, 6 pages.

(Continued)

Primary Examiner — Matthew G Marini
(74) Attorney, Agent, or Firm — RatnerPrestia (57) ABSTRACT

A method for detecting a change in location of at least one wheel of a motor vehicle, the vehicle having at least one central processing unit, one wheel unit which includes an electronic assembly of sensors and which is mounted on the wheel, and one bidirectional communications assembly. The method notably includes a first comparison step, during which a first evaluation pattern is compared with a first reference pattern to determine whether the location of the wheel has changed, the patterns being representative of the effective location of the wheel unit in the motor vehicle.

10 Claims, 6 Drawing Sheets

(56) References Cited

U.S. PATENT DOCUMENTS

| | | | |
|---|---|---|---|
| 8,978,460 | B2 | 3/2015 | Kretschmann |
| 10,449,810 | B2 | 10/2019 | Guinart et al. |
| 2006/0012475 | A1 | 1/2006 | Froitzheim et al. |
| 2011/0304451 | A1 | 12/2011 | Lickfelt et al. |
| 2012/0029767 | A1 | 2/2012 | Bailie et al. |
| 2015/0057878 | A1 | 2/2015 | Friel et al. |
| 2017/0190224 | A1 | 7/2017 | Araya |
| 2021/0268849 | A1 | 9/2021 | Kretschmann et al. |
| 2023/0160920 | A1 | 5/2023 | Kosugi et al. |

FOREIGN PATENT DOCUMENTS

| | | |
|---|---|---|
| EP | 2537689 A1 | 12/2012 |
| WO | 2012139711 A1 | 10/2012 |
| WO | 2019092052 A1 | 5/2019 |
| WO | 2019243374 A1 | 12/2019 |

OTHER PUBLICATIONS

Non Final Office Action for U.S. Appl. No. 18/024,561, dated Jul. 5, 2023, 25 pages.
International Search Report and Written Opinion for International Application No. PCT/EP2021/073505, dated Oct. 21, 2021, 8 pages.
International Search Report and Written Opinion for International Application No. PCT/EP2021/073505, dated Oct. 21, 2021, 12 pages (French).
French Search Report for French Application No. 2008995, dated Jun. 9, 2021 with translation, 9 pages.
International Search Report and Written Opinion for International Application No. PCT/EP2021/074289, dated Oct. 1, 2021, 7 pages.
International Search Report and Written Opinion for International Application No. PCT/EP2021/074289, dated Oct. 1, 2021, 11 pages (French).
French Search Report for French Application No. 2008997, dated Apr. 20, 2021 with translation, 9 pages.
International Search Report and Written Opinion for International Application No. PCT/EP2021/073463, dated Oct. 19, 2021, 7 pages.
International Search Report and Written Opinion for International Application No. PCT/EP2021/073463, dated Oct. 19, 2021, 11 pages (French).
French Search Report for French Application No. 2008998, dated Jul. 5, 2021 with translation, 9 pages.
English Translation of the Written Opinion for International Application No. PCT/EP2021/073505, dated Oct. 21, 2021; 6 pages.
Final Office Action for U.S. Appl. No. 18/024,561, dated Aug. 30, 2023, 21 pages.

\* cited by examiner

METHOD FOR DETECTING A CHANGE IN LOCATION OF AT LEAST ONE WHEEL OF A MOTOR VEHICLE

CROSS REFERENCE TO RELATED APPLICATIONS

This application is the U.S. National Phase Application of PCT International Application No. PCT/EP2021/073505, filed Aug. 25, 2021, which claims priority to French Patent Application No. FR2008995, filed Sep. 4, 2020, the contents of such applications being incorporated by reference herein.

FIELD OF THE INVENTION

The present patent application relates to a method for detecting a change in location of at least one wheel of a motor vehicle, this method having applications notably in the field of equipment for motor vehicles.

BACKGROUND OF THE INVENTION

For security purposes, it is known to equip a motor vehicle with a monitoring system known by the acronym "TPMS" (Tire Pressure Monitoring System).

Such a monitoring system generally has a central processing unit, wheel units, each of which equips an associated wheel of the vehicle, and a radiofrequency communications assembly suitable for ensuring communication between each wheel unit and the central processing unit.

The central unit has an electronic processor known by the abbreviation "ECU" (Electronic Control Unit).

Each wheel unit comprises an electronic assembly of sensors in order notably to detect an anomaly with the wheel. These sensors may, for example, be a tire inflation pressure sensor, a temperature sensor and a wheel acceleration sensor.

In addition, each wheel unit has a battery and a memory.

The communications assembly makes it possible to exchange messages, or signals, bidirectionally between the central unit, and/or a mobile terminal, and each wheel unit. The messages notably include data representative of the operating parameters of each wheel and an identification code for each wheel unit.

The communication is done according to a communication protocol for the short-range bidirectional exchange of data using ultra-high-frequency, or "UHF", radio waves, for example according to a communication protocol of the Bluetooth® type.

It is essential to know the location of each wheel unit on the various wheels of the vehicle to utilize the data transmitted by the wheel units. More particularly, the location information is necessary in order to know what recommended pressure threshold must be applied, depending on whether it is a question of a front wheel or a rear wheel, and also to display the current pressure values at the associated wheel.

The location of the wheel units in relation to a wheel location in the vehicle is generally verified at the start of a new running cycle and requires, according to the existing prior art, periodic transmissions of messages synchronized with a determined angular position from the wheel unit to the central unit.

To that end, notably known is document WO 2012/139711, which describes a method for locating the wheels of a motor vehicle by synchronized messages.

The energy necessary to transmit the messages from each wheel unit is supplied by the battery associated with the emitting wheel unit.

However, the battery of each wheel unit has a limited service life and is not intended to be recharged. It is therefore imperative to limit the energy consumption in order to optimize the service life of the battery of each wheel unit.

In addition, it will be noted that, when the location of the wheel units is verified at the start of each running cycle, this produces an unchanged result for the location of the wheel units most of the time. This is because the wheels are changed or switched over only once or twice per year on average, notably when there is a changeover between winter tires and summer tires, which is a proportion of the effective change in the location of the wheel units that represents less than one percent of the wheel unit location procedures.

Also known is a method for verifying a change in location of the wheel units, described in document US 2011/0304451, which queries each wheel unit when the engine is started up in order to determine whether the location of the wheel units has changed since the last time the engine was started up.

Although such a method makes it possible to limit the procedures for verifying the location of the wheel units, this method is complex to implement and requires an assembly of supplementary components for each wheel unit, such as a dedicated low-frequency antenna, a low-frequency controller, and dedicated wiring.

The existing prior art does not provide a simple and reliable solution ensuring the detection of a change in location of the wheel units with a low expense in terms of energy.

SUMMARY OF THE INVENTION

The present invention notably aims to resolve these drawbacks.

This objective, and others which will become apparent from reading the following description, is achieved by a method for detecting a change in location of at least one wheel of a motor vehicle, said vehicle having at least: —one central processing unit,
- one wheel unit which comprises an electronic assembly of sensors and which is mounted on said wheel of the motor vehicle, and
- one bidirectional radiofrequency communications assembly designed to ensure communication between the wheel unit and the central unit,
the method comprises at least:
- a first preliminary configuration step, during which the central unit emits a series of messages to the wheel unit via the communications assembly, the series of messages being emitted when the vehicle runs, according to the predetermined instantaneous angular positions of the associated wheel, and the wheel unit establishes and records a first reference pattern representative of its location in the motor vehicle, by measuring the power of said received messages,
- a first transmission step, during which the central processing unit re-emits the series of messages emitted during the first preliminary configuration step,
- a first evaluation step, performed by the wheel unit, during which a first evaluation pattern is established by measuring the power of the series of messages received during the first transmission step, and a first comparison step, during which the first evaluation pattern is compared with the first reference pattern to determine whether the location of the wheel has changed.

Thus, the method according to an aspect of the invention offers a simple and effective way of limiting the number of procedures for locating the wheel units and consequently limiting the wear on the battery of each wheel unit.

According to other, optional features of the method according to an aspect of the invention, taken individually or in combination:

the method comprises at least:
a second preliminary configuration step, during which the wheel unit emits a series of messages to the central unit via the communications assembly, the series of messages being emitted when the vehicle runs, according to the predetermined instantaneous angular positions of the associated wheel, and the central unit establishes and records a second reference pattern by measuring the power of said received messages,
a second transmission step, during which the wheel unit re-emits the series of messages emitted during the second preliminary configuration step,
a second evaluation step, during which a second evaluation pattern is established by the central unit by measuring the power of the series of messages emitted during the second transmission step,
a second comparison step, during which the second evaluation pattern is compared with the second reference pattern by the central processing unit to determine whether the location of the wheel has changed. These second steps make it possible to enhance the reliability of the method by doubling the evaluation and reference patterns;
the first comparison step is performed by the wheel unit;
the first comparison step is performed by the central unit; the burden of the first comparison step being taken on by the central unit so as to relieve the battery of the wheel units;
said motor vehicle has a plurality of central processing units, each central unit being designed to communicate with the at least one wheel unit via the bidirectional communications assembly to consolidate said reference patterns and said evaluation patterns;
said messages making it possible to establish said reference patterns and said evaluation patterns each comprises an identification reference; This feature makes it possible to overcome the problem of a non-received message and to continue the procedure in an adequate downgraded mode;
the method is applied to a motor vehicle that has at least one speed sensor which is designed to indicate the instantaneous angular position of the wheel to the central unit; the speed sensors offer an advantage in terms of saving power and resources for the wheel units, which do not have to supply and transmit the data for the angular positions of the wheels;
the method comprises a locating step which aims to determine the location of the wheel on the motor vehicle and which is performed if the location of the wheel has been estimated to have changed during the first comparison step and/or the second comparison step.
the method is applied to a motor vehicle that has a plurality of wheels which are each associated with a wheel unit.

An aspect of the present invention also relates to a motor vehicle comprising at least one central processing unit, one wheel unit which comprises an electronic assembly of sensors and which is mounted on a wheel of the motor vehicle, and one bidirectional radiofrequency communications assembly designed to ensure communication between the wheel unit and the central unit, said central unit and/or said wheel unit and/or said communications assembly being suitably programmed to implement the method described above.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DETAILED DESCRIPTION OF THE PREFERRED EMBODIMENTS

Figure 1:
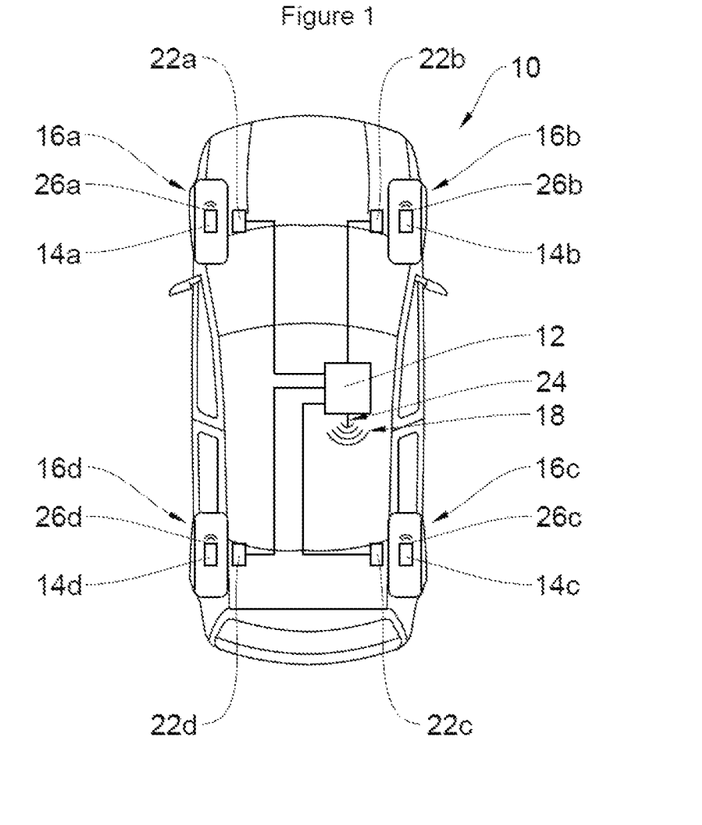
FIG. 1: illustrates a schematic view of a motor vehicle equipped with units of a communications assembly, to which vehicle the method according to an aspect of the invention is applied.

FIG. 1 depicts a motor vehicle 10 which is equipped with a central processing unit 12, with four wheel units 14a, 14b, 14c, 14d which are each mounted on an associated wheel 16a, 16b, 16c, 16d, and with a bidirectional communications assembly 18.

The central unit 12 notably includes an electronic processor known by the abbreviation "ECU" (Electronic Control Unit), and a memory.

Each wheel unit 14a, 14b, 14c, 14d comprises an electronics housing containing an assembly of sensors which are dedicated to measuring parameters such as the radial acceleration of the associated wheel, the pressure and the temperature of the tire with which the associated wheel is equipped. Each wheel unit 14a, 14b, 14c, 14d also has a battery and a memory (which are not depicted).

In addition, the motor vehicle 10 has four speed sensors 22a, 22b, 22c, 22d which are mounted in the vicinity of each associated wheel 16a, 16b, 16c, 16d and are designed to transmit the instantaneous angular position and speed of the associated wheel to the central unit 12 via the communications assembly 18.

The communications assembly 18 makes it possible to exchange messages, or signals, bidirectionally between the central unit 12 and each wheel unit 14a, 14b, 14c, 14d.

For that purpose, the communications assembly 18 has an emitter-receiver 24 which is associated with the central unit 12 and four emitter-receivers 26a, 26b, 26c, 26d which are each associated with one wheel unit 14a, 14b, 14c, 14d, respectively.

The messages exchanged between the central unit 12 and each wheel unit 14a, 14b, 14c, 14d notably include data representative of operating parameters of each wheel 16a, 16b, 16c, 16d and an identification code for each wheel unit 14a, 14b, 14c, 14d.

The communication is done according to a communication protocol for the short-range bidirectional exchange of data using ultra-high-frequency, or "UHF", radio waves. As a preference, the method according to an aspect of the invention adopts a communication protocol of the Bluetooth® type which makes it possible to immediately emit a message referred to as "scan request" in response to a received message known as "advertising".

Figure 2:
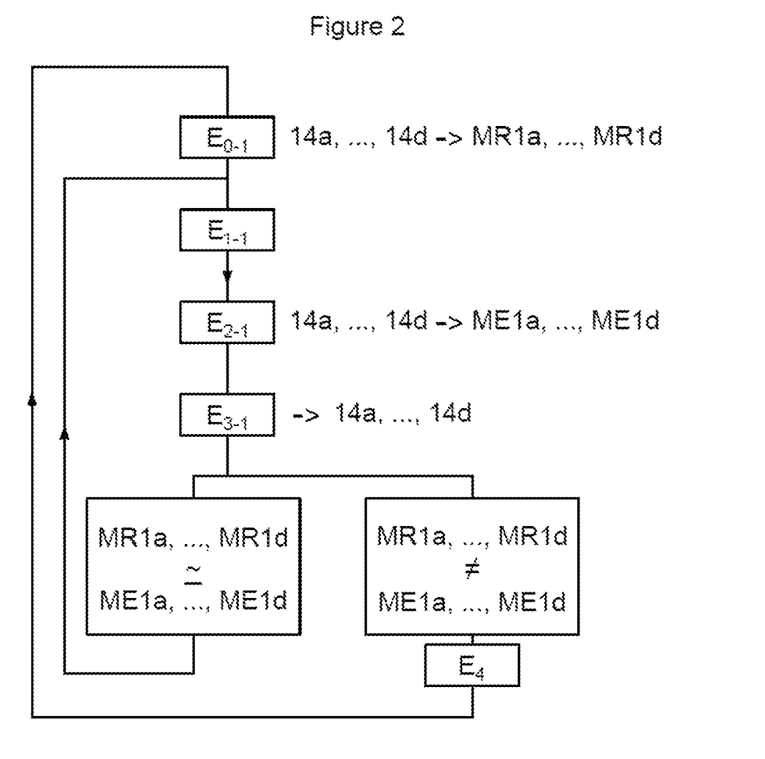
FIG. 2: illustrates a flowchart of a first embodiment of the method according to the invention.

The method for detecting a change in location of the wheels, according to a first embodiment of the invention illustrated in FIG. 2, comprises a first preliminary configuration step E0-1, during which the central unit 12 emits a series of messages to each wheel unit 14a, 14b, 14c, 14d via the communications assembly 18, from one wheel unit 14a, 14b, 14c, 14d to the next in succession.

The first preliminary step E0-1 is performed at the end of a first procedure for locating the wheel units 14a, 14b, 14c, 14d, which follows on from an initialization or, repetitively, from a location update demand following detection of a change in location of at least one wheel unit 14a, 14b, 14c, 14d. The locating procedure makes it possible to establish the reference position for each wheel unit 14a, 14b, 14c, 14d.

Each wheel unit 14a, 14b, 14c, 14d establishes and records in its memory a first reference pattern MR1a, MR1b, MR1c, MR1d illustrated in FIGS. 3 to 6, respectively, which is representative of the location of said wheel unit in the motor vehicle 10. The starting assumption is that the location of each wheel 16a, 16b, 16c, 16d is known and correct at the time at which the reference patterns are established.

Figure 3:
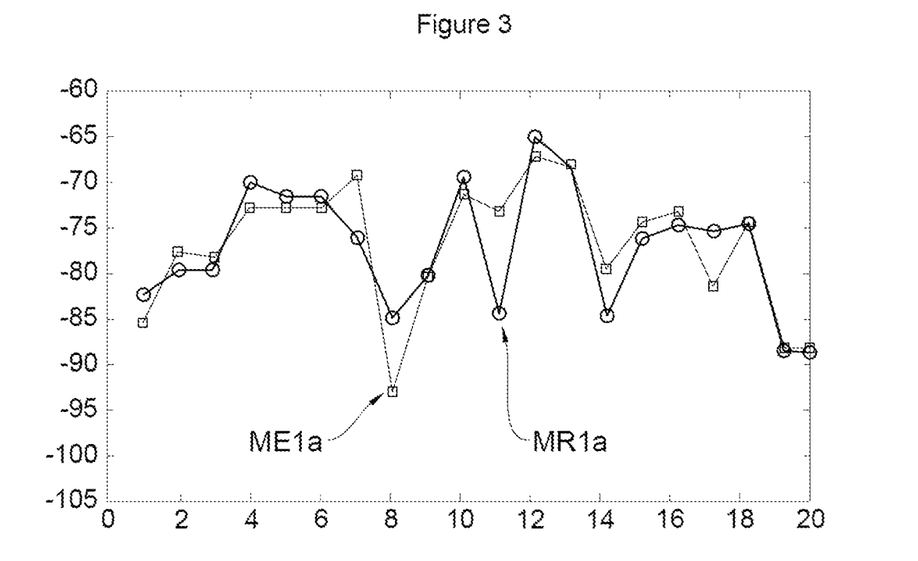
FIG. 3: depicts, in the form of a graph, the first reference pattern and the first evaluation pattern which are associated with the front left wheel of a vehicle where the location of the wheel concerned is unchanged.
Figure 4:
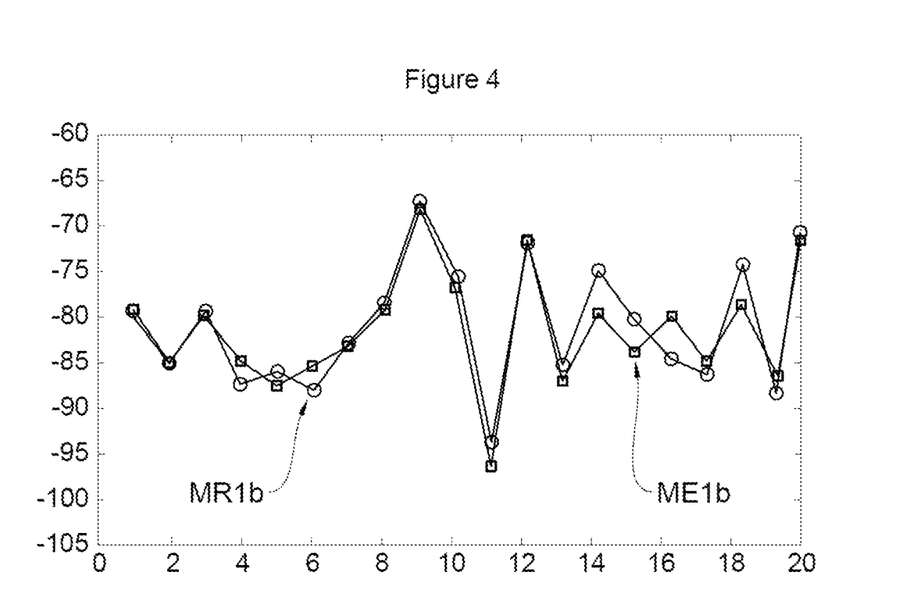
FIG. 4: depicts, in the form of a graph, the first reference pattern and the first evaluation pattern which are associated with the front right wheel of a vehicle where the location of the wheel concerned is unchanged.
Figure 5:
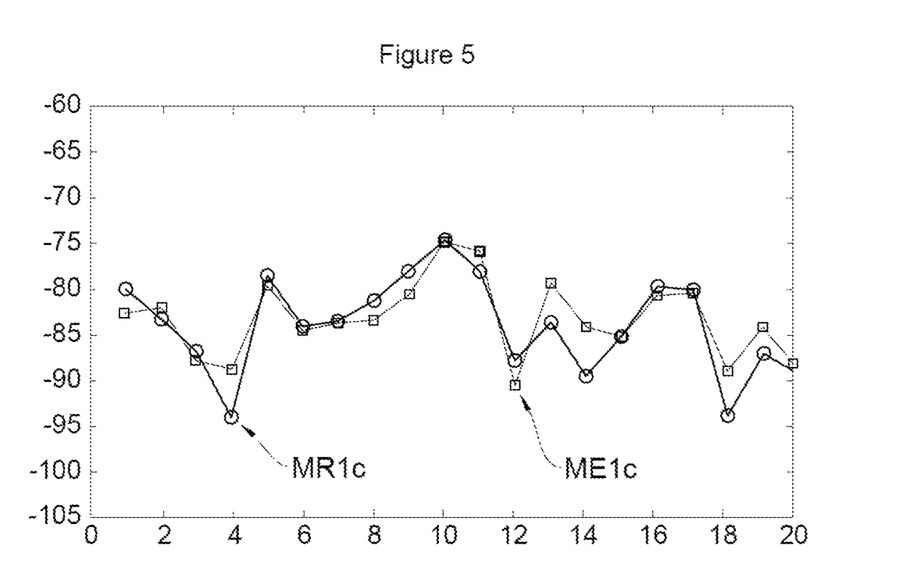
FIG. 5: depicts, in the form of a graph, the first reference pattern and the first evaluation pattern which are associated with the rear left wheel of a vehicle where the location of the wheel concerned is unchanged.
Figure 6:
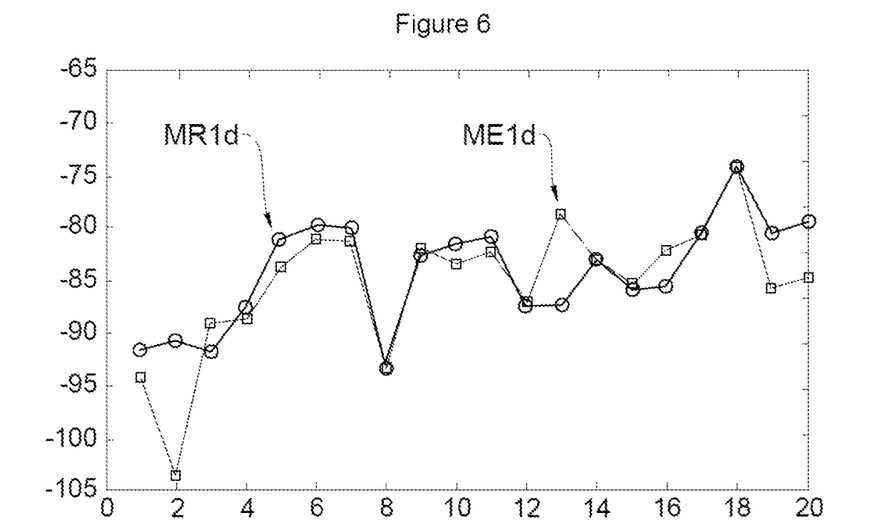
FIG. 6: depicts, in the form of a graph, the first reference pattern and the first evaluation pattern which are associated with the rear right wheel of a vehicle where the location of the wheel concerned is unchanged.

More specifically, the first reference pattern MR1a, which corresponds to the front left wheel 16a and is illustrated in FIG. 3, the first reference pattern MR1b, which corresponds to the front right wheel 16b and is illustrated in FIG. 4, the first reference pattern MR1c, which corresponds to the rear right wheel 16c and is illustrated in FIG. 5, and the first reference pattern MR1d, which corresponds to the rear left wheel 16d and is illustrated in FIG. 6.

Each first reference pattern MR1a, MR1b, MR1c, MR1d is established by measuring the power of the messages received previously during the first preliminary configuration step E0-1.

The power of the received messages is known in telecommunications by the acronym RSSI, which stands for Received Signal Strength Indication and which is a measure of the power of a received signal on reception, and gives an indication as to the signal strength of the received signal. This measure of power is expressed in "dBm", which is an abbreviation for the ratio of the power in decibels between the measured power and one milliwatt.

Thus, a "pattern" means a characteristic signature of the messages, or signals, transmitted by a wheel unit 14a, 14b, 14c, 14d or by the central unit 12. Each pattern is specific to the location, in the motor vehicle 10, of the associated wheel unit 14a, 14b, 14c, 14d that emits or receives the messages.

As can be seen in FIGS. 3 to 6, the first reference pattern MR1a, MR1b, MR1c, MR1d takes the form of a depiction in the form of a graph, with the abscissa axis indicating the rank of the "RSSI" measurement from a predefined maximum set of synchronized emissions of messages, in this instance twenty, and the ordinate axis indicating the power, or "RSSI", of the messages or signals, measured in dBm.

According to the embodiment described in the present description, each first reference pattern MR1a, MR1b, MR1c, MR1d comprises twenty synchronized "RSSI" measurements per revolution of the wheel, that is to say according to the predetermined angular positions of the associated wheel 16a, 16b, 16c, 16d about its axis of rotation.

As a preference, the emissions of messages are evenly distributed over a wheel revolution of 360 degrees.

However, there may be technical limitations on achieving this preference. For example, in the event that the vehicle speed is too high, there may not be enough time to emit twenty messages that are evenly distributed over one single revolution of the wheel. In that case, it is possible to distribute the emissions over several revolutions. Moreover, there is nothing to rule against a non-uniform angular distribution of the emissions of the messages. As a generalization, it is enough for the rank of the emission of the message to be associated with an angular position defined in advance or on the spot and stored by the emitter so that the emissions of messages can be reproduced from the reference pattern for the next evaluation pattern. For example, it is conceivable to emit a series of messages over several revolutions of the wheel, with emissions of different rank nevertheless being ultimately synchronized to identical angular positions.

Advantageously, the messages are synchronized by directly interpreting the data supplied by the speed sensor 22a, 22b, 22c, 22d that is associated with the wheel 16a, 16b, 16c, 16d in question. The synchronization of the messages by the speed sensors 22a, 22b, 22c, 22d offers an advantage in terms of reliability because of the stability of the data, or signals, emitted by the speed sensors 22a, 22b, 22c, 22d and an advantage in terms of saving energy and resources for the wheel units 14a, 14b, 14c, 14d, which do not have to supply and transmit the data for the angular positions of the wheels.

Still according to the first embodiment of the invention, the method includes a first transmission step E1-1, during which the central unit 12 re-emits the series of messages emitted during the first preliminary configuration step E0-1 to each wheel unit 14a, 14b, 14c, 14d.

The first transmission step E1-1 is followed by a first evaluation step E2-1, during which each wheel unit 14a, 14b, 14c, 14d establishes a first evaluation pattern ME1a, ME1b, ME1c, ME1d, respectively, shown in FIGS. 3 to 6 by measuring the power of the series of messages received during the preceding first transmission step E1-1.

More specifically, the first evaluation pattern ME1a, which corresponds to the front left wheel 16a and is illustrated in FIG. 3, the first evaluation pattern ME1b, which corresponds to the front right wheel 16b and is illustrated in FIG. 4, the first evaluation pattern ME1c, which corresponds to the rear right wheel 16c and is illustrated in FIG. 5, and the first evaluation pattern ME1d, which corresponds to the rear left wheel 16d and is illustrated in FIG. 6.

The messages, which make it possible to establish the reference patterns and said evaluation patterns, each comprise an identification reference. This identification reference makes it possible to identify each message notably so as to establish the evaluation patterns and the reference patterns in identical ways. Because of the haphazard nature of wireless communication, it may be the case that certain messages are not received. Identifying each message in a series allows each wheel unit to realign the evaluation patterns and the reference patterns in pairs and to reject singletons.

This feature makes it possible to overcome the problem of a non-received message and continue the procedure in an adequate downgraded mode.

After the first evaluation step E2-1, the method includes a first comparison step E3-1, during which each wheel unit 14a, 14b, 14c, 14d compares the first evaluation pattern ME1a, ME1b, ME1c, ME1d with the associated first reference pattern MR1a, MR1b, MR1c, MR1d recorded in its memory, in order to determine whether the location of the wheel 16a, 16b, 16c, 16d concerned in the motor vehicle 10 has changed.

According to one preferred embodiment, the first evaluation pattern ME1a, ME1b, ME1c, ME1d is compared with the associated first reference pattern MR1a, MR1b, MR1c, MR1d by an algorithm based on a least-squares method.

Figure 7:
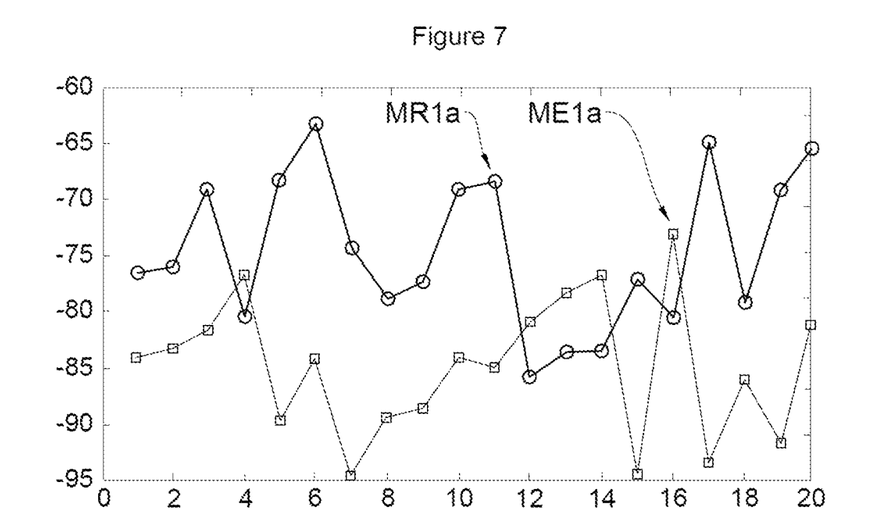
FIG. 7: depicts, in the form of a graph, the first reference pattern and the first evaluation pattern which are associated with the front right wheel of a vehicle where the location of the wheel concerned has changed.

If the distance between the first evaluation pattern ME1a, ME1b, ME1c, ME1d and the first reference pattern MR1a, MR1b, MR1c, MR1d exceeds a predetermined decision threshold, as illustrated in FIG. 7, the algorithm concludes that the location of the wheel 16a, 16b, 16c, 16d in question has changed and a locating step E4 for locating the wheels 16a, 16b, 16c, 16d of the motor vehicle 10 is executed. This locating step E4, which is known from the prior art, is not at the heart of an aspect of the present invention and will therefore not be described in more detail.

Conversely, with reference to FIGS. 3 to 6, if the distance between the first evaluation pattern ME1a, ME1b, ME1c, ME1d and the first reference pattern MR1a, MR1b, MR1c, MR1d does not exceed the predetermined decision threshold, the algorithm concludes that the location of the wheel 16a, 16b, 16c, 16d in question has not varied, and the locating step E4 for locating the wheels 16a, 16b, 16c, 16d is therefore not required.

The decision threshold is predetermined depending on the number of measurements performed to establish the first evaluation pattern ME1a, ME1b, ME1c, ME1d per revolution of the wheel, and also depending on the measurement noise level, measured in "dBm". The measurement noise level is not necessarily known in advance and so a threshold, for example 10 dBm, is fixed in advance. Nonlimitingly, it is possible to evaluate the noise in order to adjust the decision threshold more accurately.

According to a variant of the first embodiment of the invention, each wheel unit 14a, 14b, 14c, 14d sends the first evaluation pattern ME1a, ME1b, ME1c, ME1d and the first reference pattern MR1a, MR1b, MR1c, MR1d to the central unit 12, and the central unit 12 executes the first comparison stage E3-1 to alleviate the processing burden on the wheel units 14a, 14b, 14c, 14d. To that end, each wheel unit 14a, 14b, 14c, 14d resends the RSSI information it has gathered to the central unit 12 as a systematic response after each message has been received by the wheel unit in question.

The detection method according to an aspect of the invention comprises a second embodiment, according to which the messages are sent from the central unit 12 to each wheel unit 14a, 14b, 14c, 14d, as for the first embodiment described above, and also from each wheel unit 14a, 14b, 14c, 14d to the central unit 12, so as to improve the robustness of the method.

More specifically, according to the second embodiment, the method includes a first preliminary configuration step E0-1, a first transmission step E1-1, a first evaluation step E2-1, and a first comparison step E3-1, these steps being identical to the steps with the same reference that are described above for the first embodiment and therefore not being described in detail in order not to unnecessarily overload the description.

Figure 8:
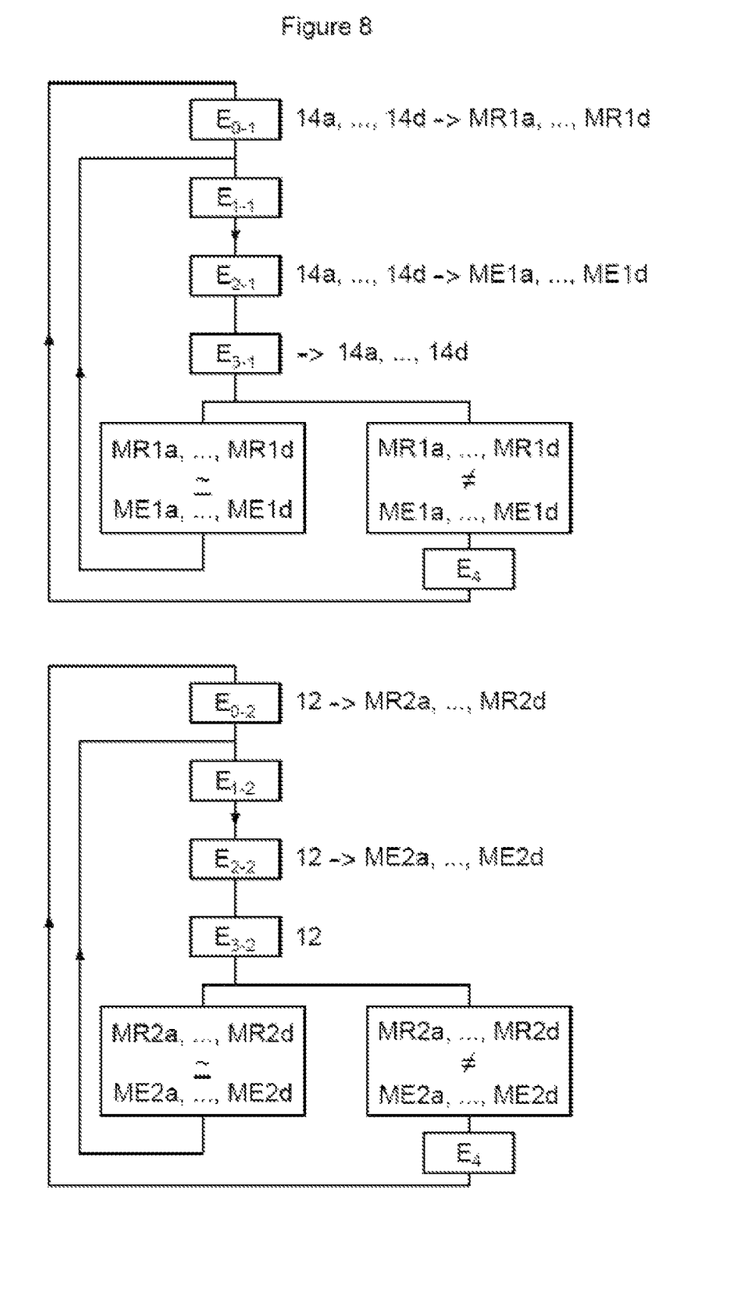
FIG. 8 illustrates a flowchart of a second embodiment of the method according to the invention.

In addition, according to the second embodiment illustrated in FIG. 8, the method comprises a second preliminary configuration step E0-2, during which each wheel unit 14a, 14b, 14c, 14d emits a series of messages to the central unit 12 via the communications assembly 18 in succession. The messages emitted during this second configuration step E0-2 for each wheel unit are emitted as a response, or reaction, to the reception of the messages emitted by the central unit 12 during the first configuration step E0-1.

The central unit 12 establishes and records a second reference pattern MR2a, MR2b, MR2c, MR2d (which are not depicted), which is representative of the location of the emitting wheel unit 14a, 14b, 14c, 14d, by measuring the power of the messages received during the second preliminary configuration step E0-2.

Still according to the second embodiment, the method includes a second transmission step E1-2, during which each wheel unit 14a, 14b, 14c, 14d re-emits the series of messages emitted during the preceding second preliminary configuration step E0-2 to the central unit 12.

The second transmission step E1-2 is followed by a second evaluation step E2-2, during which the central unit 12 establishes a second evaluation pattern ME2a, ME2b, ME2c, ME2d (which are not depicted) by measuring the power of the series of messages received during the preceding second transmission step E1-2.

After the second evaluation step E2-2, the method includes a second comparison step E3-2, during which the central unit 12 compares the second evaluation pattern ME2a, ME2b, ME2c, ME2d with the associated second reference pattern MR2a, MR2b, MR2c, MR2d recorded in its memory, in order to determine whether the location of the wheel 16a, 16b, 16c, 16d in question in the motor vehicle 10 has changed.

The second evaluation pattern ME2a, ME2b, ME2c, ME2d is compared with the associated second reference pattern MR2a, MR2b, MR2c, MR2d by an algorithm based on a least-squares method. If the distance between the second evaluation pattern ME2a, ME2b, ME2c, ME2d and the second reference pattern MR2a, MR2b, MR2c, MR2d exceeds a predetermined decision threshold, the algorithm concludes that the location of the wheel 16a, 16b, 16c, 16d in question has changed and a locating step E4 for locating the wheels 16a, 16b, 16c, 16d of the motor vehicle 10 is executed.

Conversely, if the distance between the second evaluation pattern ME2a, ME2b, ME2c, ME2d and the second reference pattern MR2a, MR2b, MR2c, MR2d does not exceed the predetermined decision threshold, the algorithm concludes that the location of the wheel 16a, 16b, 16c, 16d in question has not varied, and the locating step E4 for locating the wheels 16a, 16b, 16c, 16d is therefore not required.

In the same way as for the first embodiment of the method, the decision threshold is predetermined, as is the number of messages emitted synchronously by the wheel units 14a, 14b, 14c, 14d.

According to the exemplary embodiment described here for the second embodiment of the invention, the priority is to detect a change in location of at least one wheel 16a, 16b, 16c, 16d. That is to say, the locating step E4 for locating the wheels 16a, 16b, 16c, 16d is necessary if the first comparison step E3-1 or the second comparison step E3-2 estimate that the location of one of the wheels has changed.

Conversely, in an embodiment variant, the locating step E4 for locating the wheels 16a, 16b, 16c, 16d is necessary if the first comparison step E3-1 and the second comparison step E3-2 estimate that the location of one of the wheels has changed. The detection method according to an aspect of the invention comprises a third embodiment depicted in FIG. 9, which is identical to the second embodiment described above except for the fact that the first comparison step E3-1 is not performed by the wheel units 14a, 14b, 14c, 14d but by the central unit 12.

Figure 9:
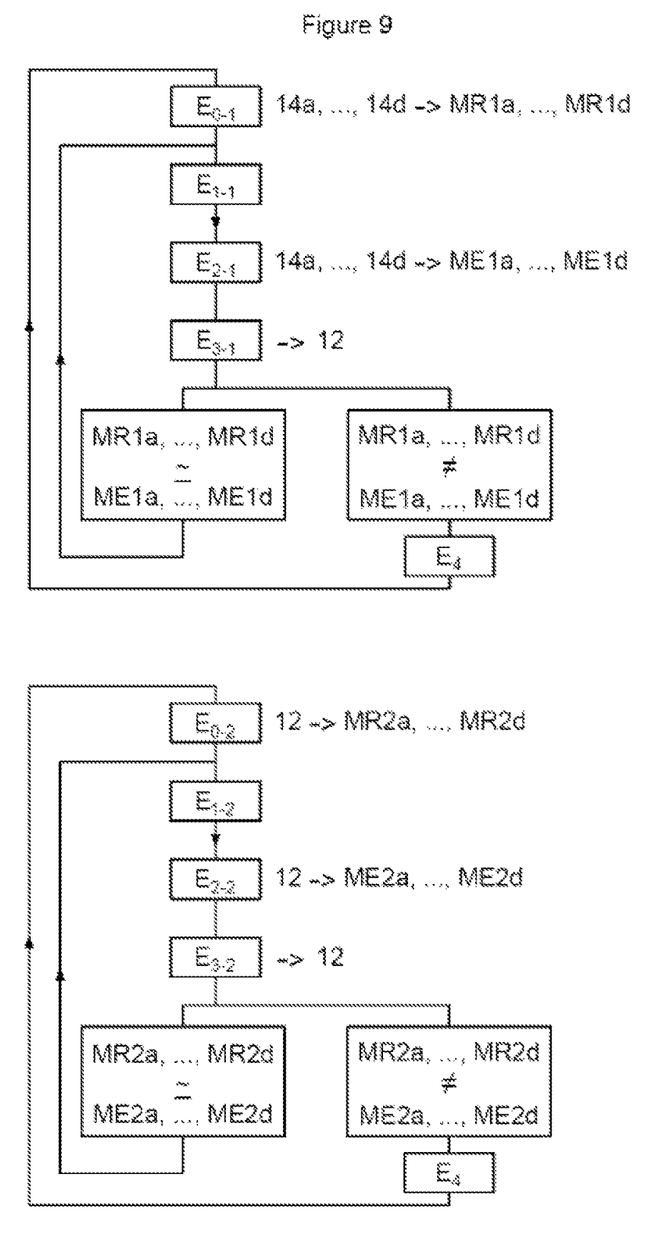
FIG. 9 illustrates a flowchart of a third embodiment of the method according to the invention.

To that end, each wheel unit 14a, 14b, 14c, 14d sends the first evaluation pattern ME1a, ME1b, ME1c, ME1d and the first reference pattern MR1a, MR1b, MR1c, MR1d to the central unit 12, and the central unit 12 executes the first comparison stage E3-1.

Advantageously, the third embodiment of the method makes it possible to alleviate the processing burden on the wheel units 14a, 14b, 14c, 14d.

According to one embodiment variant, which is not depicted and is common to the three embodiments described above, the motor vehicle 10 has a plurality of central processing units 12, each of which is designed to communicate with each wheel unit 14a, 14b, 14c, 14d via the bidirectional communications assembly 18. This variant makes it possible to multiply the "dimensions" of each reference pattern MR1a, MR1b, MR1c, MR1d, MR2a, MR2b, MR2c, MR2d and each evaluation pattern ME1a, ME1b, ME1c, ME1d, ME2a, ME2b, ME2c, Me2d by a dimension for each central unit 12, by virtue of which each reference pattern MR1a, MR1b, MR1c, MR1d, MR2a, MR2b, MR2c, MR2d and each evaluation pattern ME1a, ME1b, ME1c, ME1d, ME2a, ME2b, ME2c, ME2d is consolidated.

The detection method according to an aspect of the invention proposes a reliable solution which has a low rate of false negatives, that is to say of undetected changes in location of the wheels.

In addition, the method according to an aspect of the invention is particularly suitable for implementation in an environment of the BLE type, which stands for "Bluetooth® Low Energy" and offers the option of bidirectional exchanges between the central unit(s) 12 and the wheel units 14a, 14b, 14c, 14d.

The invention claimed is:

1. A method for detecting a change in location of at least one wheel of a motor vehicle, said vehicle having at least:
   one central processing unit,
   one wheel unit which comprises an electronic assembly of sensors and which is mounted on said wheel of the motor vehicle, and
   one bidirectional radiofrequency communications assembly designed to ensure communication between the wheel unit and the central unit,
   the method comprises at least:
   a first preliminary configuration step, during which the central unit emits a series of messages to the wheel unit via the communications assembly, the series of messages being emitted when the vehicle runs, according to the predetermined instantaneous angular positions of the associated wheel, and the wheel unit establishes and records a first reference pattern representative of its location in the motor vehicle, by measuring the power of said received messages,
   a first transmission step, during which the central processing unit re-emits the series of messages emitted during the first preliminary configuration step,
   a first evaluation step, performed by the wheel unit, during which a first evaluation pattern is established by measuring the power of the series of messages received during the first transmission step, and
   a first comparison step, during which the first evaluation pattern is compared with the first reference pattern to determine whether the location of the wheel has changed.

2. The detection method as claimed in claim 1, further comprising at least:
   a second preliminary configuration step, during which the wheel unit emits a series of messages to the central unit via the communications assembly, the series of messages being emitted when the vehicle runs, according to the predetermined instantaneous angular positions of the associated wheel, and the central unit establishes and records a second reference pattern by measuring the power of said received messages,
   a second transmission step, during which the wheel unit re-emits the series of messages emitted during the second preliminary configuration step,
   a second evaluation step, during which a second evaluation pattern is established by the central unit by measuring the power of the series of messages emitted during the second transmission step, and
   a second comparison step, during which the second evaluation pattern is compared with the second reference pattern by the central processing unit to determine whether the location of the wheel has changed.

3. The detection method as claimed in claim 1, wherein the first comparison step is performed by the wheel unit.

4. The detection method as claimed in claim 1, wherein the first comparison step is performed by the central unit.

5. The detection method as claimed in claim 1, wherein said motor vehicle has a plurality of central processing units, each central unit being designed to communicate with the at least one wheel unit via the bidirectional communications assembly to consolidate said reference patterns and said evaluation patterns.

6. The detection method as claimed in claim 1, wherein said messages making it possible to establish said reference patterns and said evaluation patterns each comprises an identification reference.

7. The detection method as claimed in claim 1, applied to a motor vehicle that has at least one speed sensor which is designed to indicate the instantaneous angular position of the wheel to the central unit.

8. The detection method as claimed in claim 1, further comprising a locating step which aims to determine the location of the wheel on the motor vehicle and which is performed if the location of the wheel has been estimated to have changed during the first comparison step and/or the second comparison step.

9. The detection method as claimed in claim 1, applied to a motor vehicle that has a plurality of wheels which are each associated with a wheel unit.

10. A motor vehicle comprising at least one central processing unit, one wheel unit which comprises an electronic assembly of sensors and which is mounted on a wheel of the motor vehicle, and one bidirectional radiofrequency communications assembly designed to ensure communication between the wheel unit and the central unit, characterized in that said central unit and/or said wheel unit and/or said communications assembly are suitably programmed to implement the method as claimed in claim 1.

* * * * *

UNITED STATES PATENT AND TRADEMARK OFFICE
CERTIFICATE OF CORRECTION

Page 1 of 1

PATENT NO. : 11,865,874 B2
APPLICATION NO. : 18/024551
DATED : January 9, 2024
INVENTOR(S) : Nicolas Guinart, Jean-Philippe Boisset and Sylvain Godet It is certified that error appears in the above-identified patent and that said Letters Patent is hereby corrected as shown below:

On the Title Page

Item (72) Inventors: Change "Jean-Phillippe Boisset" to --Jean-Philippe Boisset--.

Item (73) Assignee: Change "Continental Automotive Technologies GmbH" to --Continental Automotive Technologies GmbH, Hannover (DE)--.

Signed and Sealed this
First Day of April, 2025

Coke Morgan Stewart
*Acting Director of the United States Patent and Trademark Office*